Figure 1:
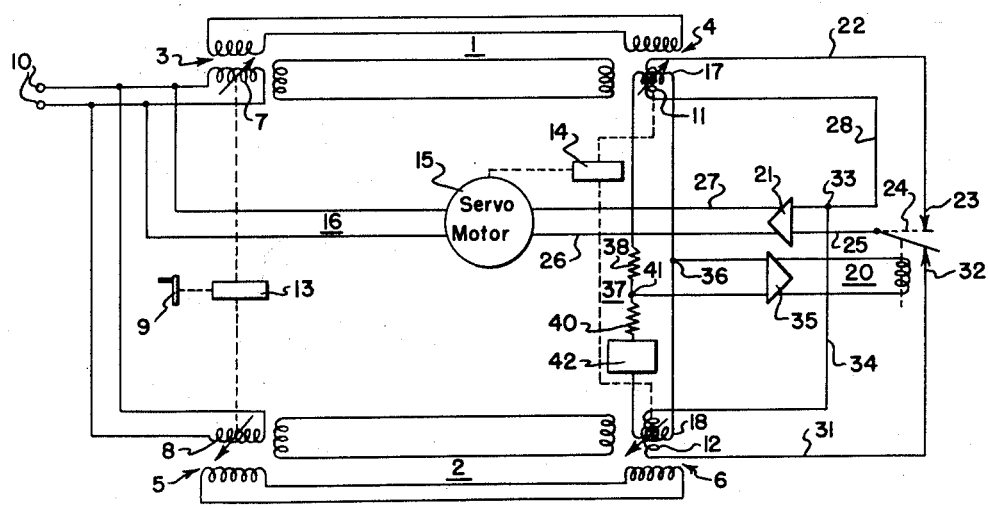

INVENTOR.
BY Lloyd L. Gordon

United States Patent Office 2,933,666
Patented Apr. 19, 1960

2,933,666

SELSYN CONTROLLED SERVO SYSTEM

Lloyd L. Gordon, Miami, Fla., assignor to Electronic Associates, Inc., Long Branch, N.J., a corporation of New Jersey Continuation of abandoned application Serial No. 426,343, April 29, 1954. This application April 29, 1958, Serial No. 731,731

4 Claims. (Cl. 318—30)

This invention relates to dual selsyn channel servo control systems and more particularly to means for switching the control of a servo motor, which drives a controlled object in response to the position of a controlling object, from one channel to another of a dual channel selsyn system only when the controlling object and the controlled object are in substantially the same alignment.

This application is a continuation of my copending application for United States Letters Patent entitled "Servo Switching Control," Serial No. 426,343, filed April 29, 1954, now abandoned.

Dual channel selsyn systems are utilized to transmit signals regarding the position of a controlling object to a remote station where the signals are used to control the operation of a servo motor which drives a controlled object. The purpose of such a system is to drive the controlled object so that its position is substantially synchronous with the position of the controlling object.

Dual channel systems for this purpose are well known and their characteristics and operation are familiar to those skilled in the art. Conventionally, such systems comprise a coarse and a fine transmission channel, each channel having a voltage transmitter or synchronous generator at the location of a controlling or directing object and a signal receiver at a remote location where there is a movable object to be controlled. The controlling object is coupled to the rotor of the coarse transmitter through a gear train having a low ratio such as 1:1 and to the rotor of the fine transmitter through a train having a high ratio such as 10:1, i.e. the rotor turns ten revolutions for each complete revolution or other motion of the controlling object.

At the remote location of the controlled object there is a servo motor which is controlled by the output voltages of the receivers. The servo motor drives the controlled object and is also coupled to the rotors of the coarse and fine receivers through gear trains having the same ratios as the ratios of the trains coupling the controlling object to the rotors of the coarse and fine transmitters.

The output voltage of the receiver of a channel is related in phase and magnitude to the difference or "error" between the angular positions of the transmitter and receiver rotors and so long as a difference exists the voltage will cause the servo motor to turn in a direction which tends to reduce the difference in rotor position to zero. In view of the 1:1 gear ratios between the controlling and controlled objects and the coarse channel synchros the controlled object will tend within the limits of the system to follow the motion of the controlling object. However, the accuracy of the control through the low ratio of the coarse channel is not sufficient and for a highly accurate control as the positions of the controlling and controlled objects become nearly synchronous it is necessary to transfer the control to the fine channel to obtain a high resolution of the difference between the positions of the controlling and controlled objects. As is known the change of control from the coarse channel to the fine channel must take place when the positions of the controlling and controlled objects are within less than $$\frac{360}{n}$$

degrees of actual synchronism, $n$ being the gear ratio of the fine channel, or the controlled object will not attain true synchronism with the controlling object. The prior art systems have usually relied on the coincidence, when the positions of the two objects are nearly synchronous, of near zero output voltages of both the coarse and fine channel receivers to actuate some form of device which accomplishes the switching. Any system which relies on this coincidence has, however, the difficulty that there are, in fact, two coincidences of near zero output voltage. One occurs when the positions of the controlling and controlled objects are nearly synchronous. The other occurs when the position of the controlling object is actually 180° apart from that of the controlled object. This possibility that switching from coarse to fine control may occur under two conditions is referred to as "180° ambiguity." Obviously, this is a most undesirable condition.

I have invented a switching control for a dual selsyn channel servo control. My new switching control insures that the control of the servo motor can be changed from one channel to another only when the conditions in the two channels are such as to indicate true alignment between the controlling object and the controlled object, and I have effectively eliminated by means of simple and inexpensive means the difficulties encountered with presently known switching controls which are generally imprecise and are often incapable of distinguishing between true alignment and a 180° misalignment of the controlling and controlled objects.

According to my invention a selsyn controlled servo system comprises a dual channel selsyn system for controlling the position of a servo motor driven controlled object in accordance with the position of a remotely located controlling object. Each channel comprises a selsyn transmitter and a selsyn receiver. Means are provided for driving the rotors of the transmitters at predetermined rates with respect to the motion of the controlling object and means are provided for driving the rotors of the receivers at predetermined rates with respect to the motion of the servo motor driven controlled object. I also provide means for transferring the control of the servo motor from one to the other of the receivers of the different channels. This transferring means comprises a first signal source indicative of the electrical alignment of one of the receiver rotors and a second signal source indicative of the electrical alignment of another of the receiver rotors. Means are provided for comparing the signals from the first and second signal sources. Switching means, operatively connected to said comparing means, is responsive to and switches the control of the servo motor from the receiver rotor of one channel to the receiver rotor of the other channel only when the signals from the two sources have a predetermined electrical relation. By an appropriate selection of a unique value for the relation of the signals my new switching control will transfer the control of the servo motor from one receiver to the other only at an instant when the receiver rotors are in exact or substantially exact alignment and will be totally unresponsive to any other relation between the signals from the alignment indicating sources.

Figure 2:
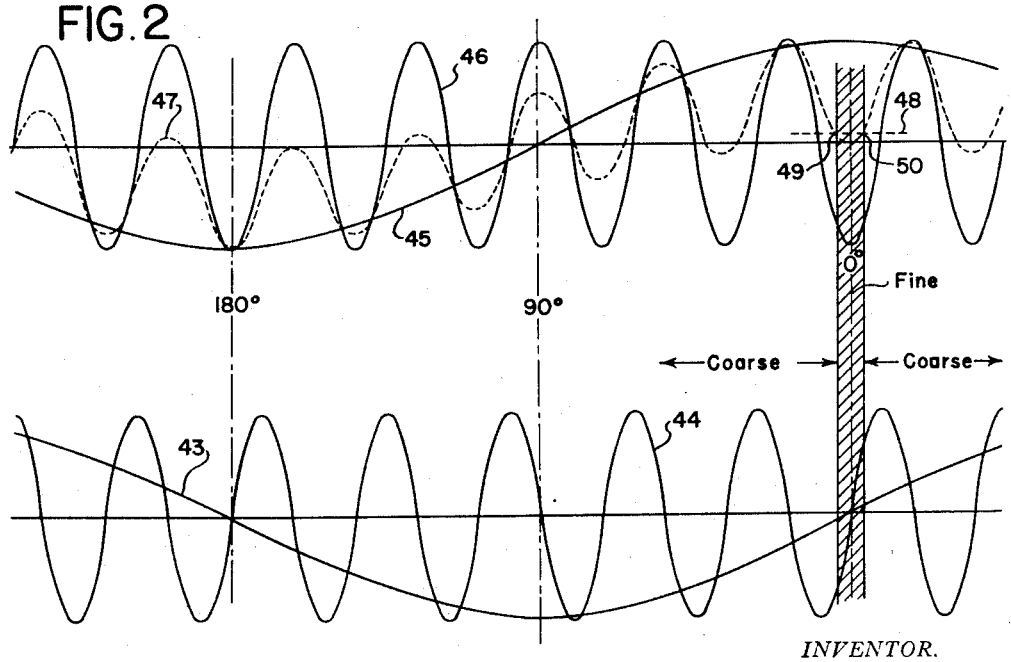

The following detailed description of a particular embodiment is given to enable those skilled in the art to fully understand my invention. In the course of the description reference is made to the accompanying drawing, in which:

Fig. 1 is a schematic representation of a dual channel selsyn system incorporating my new switching control; and Fig. 2 is a diagram illustrating the phase and magnitude relations between the output voltages of the selsyn receivers of the servo motor control switching system shown in Fig. 1.

Referring now to Fig. 1, there is shown a dual channel selsyn system. A coarse transmitting channel for transmitting signals at a high rate with a relatively low degree of precision is shown at 1. At 2 there is shown a fine transmitting channel for transmitting signals at a low rate but with a higher degree of precision than that of channel 1. The coarse channel 1 comprises a selsyn transmitter 3 and receiver 4 and the fine channel comprises a transmitter 5 and a receiver 6. The transmitters 3 and 5 have excitation coils on their rotors 7 and 8 connected to input terminals 10 on which is impressed a suitable alternating current reference voltage. A controlling object, the position of which is to be transmitted, is indicated at 9 and for purposes of illustration is shown merely as a handwheel. It will be understood that this handwheel could as well be the shaft of a rotating antenna or other apparatus. The rotors 7 and 8 are driven by handwheel 9 at predetermined ratios such as 1:1 and 10:1, respectively, by suitable means such as a gear train schematically indicated at 13.

The transmitters 3 and 5 are conventionally connected to the receivers 4 and 6 of their respective channels. For simplicity, the connections between the transmitters and receivers are shown as direct wire connections although it is to be understood that any suitable means for transmitting the output signals of the transmitters to the input of the receivers may be used.

A servo motor for driving a controlled object is shown at 15. The reference coils of the servo motor are connected to the input terminals 10 through reference channel 16. A gear train 14 similar to that indicated at 13 mechanically couples rotors 11 and 12 of receivers 4 and 6 to servo motor 15 and they are driven thereby at the same predetermined speed ratios as are the transmitter rotors.

A double throw, solenoid operated relay switch 20 is connected in output circuits from the error coils on the rotors 11 and 12 of the coarse and fine channel receivers. In this particular embodiment the normal position of the switch blade 24 is in contact with the contact 23. The blade only moves to the contact 32 when the relay coil is energized as will be explained below. The switch and the output circuits are adapted to connect either the error coil of rotor 11 or the error coil of rotor 12 to the input of an amplifier 21. The output of the amplifier is connected to the rotor of servo motor 15. The purpose of amplifier 21 is to raise the error voltages from the receivers to a level which is sufficient to drive the servo motor. The output circuit from the coarse channel receiver may be traced as follows. The error coil on rotor 11 is connected through the lead 22 to the switch contact 23, thence through the switch blade 24, the lead 25 to one input terminal of the amplifier 21. The other end of the error coil 11 is connected to the other terminal of amplifier 21 by lead 28. A similar circuit by which the servo motor 15 is controlled by the fine channel receiver may be traced as follows. The fine error coil on rotor 12 is connected through the lead 31 to the switch contact 32, thence through the switch blade 24 and the lead 25 to the amplifier input terminal. The other end of the fine error coil is connected through lead 34 to the lead 28 at 33. The output of amplifier 21 is connected to the rotor of servo motor 15 through leads 26 and 27.

Now, according to my invention each of the rotors 11 and 12 of the selsyn receivers 4 and 6 has associated therewith an auxiliary coil which I term a derived reference coil. These derived reference coils are constructed to be electrically orthogonal to the error coils on the rotors. In the coarse channel receiver 4 the reference coil is indicated at 17 and in the fine channel receiver 6 the reference coil is indicated at 18. It will be apparent to one skilled in the art that the output voltages of each of these reference coils will be ninety electrical degrees out of phase with the output voltages of their respective error coils. Accordingly, at an instant when the output voltage of an error coil is a minimum, indicative of zero error, the output voltage of the associated reference coil will be a maximum. Furthermore, there will be two angular positions of the reference coil at which the output voltage will have a maximum absolute value, but these two positions may be distinguished by the fact that the instantaneous polarity of the voltage at one such position will be opposite that of the voltage at the other position. This obviously applies to the reference coils associated with both the coarse and fine receivers. Thus, I make available signals which are indicative of the electrical orientation of the reference coils, and therefore of the error coils.

I utilize these signals to indicate alignment of the coarse and fine receivers by providing a device 37 for comparing both the magnitude and the instantaneous polarity of the output voltages of the two reference coils. This comparing means comprises the series resistance network 38, 40 which is connected in circuit with the two reference coils 17, 18. The network is adapted, by suitable selection of component values, to produce an output voltage at the terminals 36, 41 which is indicative of relative orientation of the reference coils and, in particular, to produce a null when their output voltages are simultaneously at or near maximum amplitude but 180° out of phase. In this embodiment the coils 17, 18 are electrically similar and, therefore, the resistances 38, 40 are made equal to effect the desired minimum or zero voltage. I have indicated at 42 a possible location of suitable means for adjusting the phase and magnitude of the output voltage of the fine reference coil 18 when it is necessary to compensate for variations arising in operation of the system.

The output voltage of the comparing device 37 is impressed on an amplifier 35 adapted to actuate the relay 20 and transfer the control of the servo motor from one channel to another. This amplifier is adapted by well known means to produce an output voltage sufficient to operate the relay switch 20 only in response to minimum or zero input voltage.

Referring now to Fig. 2 the operation of my new switching control may be easily summarized. In the lower portion of the figure the wave form 43 having a long period represents approximately one cycle of the error or output voltage developed across the error coil in the coarse channel receiver rotor 11. It will be noted that this voltage has a maximum negative amplitude at the 90° position and has a zero amplitude at the 0° and 180° positions. Remembering that the gear ratios in the coarse channel are 1:1 the zero amplitude at the 0° position signifies that the excitation coil on the transmitter rotor 7 and the error coil on the receiver rotor 11 are in electrical alignment and, consequently, the position of the servo motor driven controlled object is in synchronism with the position of handwheel 9 or other controlling object. The zero amplitude of wave form 43 at the 180° position signifies that the position of the servo motor driven controlled object is 180° out of synchronism with the position of handwheel 9. The varying amplitude of the wave form 43 betwen the 0° and 180° positions signifies varying degrees of asynchronism between the positions of the controlled and controlling objects. The positive amplitudes of the wave form to the left of the 180° position and to the right of the 0° position similarly signify varying degrees of asynchronism. The effect of the voltages signified by these positive and negative amplitudes is to cause the servo motor to drive the rotor 11 and the controlled object toward the 0° position to bring the position of the controlled object into synchronism with the controlling object.

The wave form 44 represents the amplitude and phase of the voltage developed across the error coil on the rotor 12 in the fine channel. When the servo motor is under the control of the error voltages developed by transmissions over the fine channel the electrical behavior of the system is the same as it is when the servo motor is under the control of error voltages developed in the coarse channel except that because of the 10:1 gear ratio the error coil on receiver rotor 12 and the excitation coil on transmitter rotor 8 come into electrical alignment ten times for each turn of the handwheel 9 and they are 180° out of alignment ten times for each turn of the handwheel. Each of these conditions is represented by a voltage of zero amplitude on the wave form 44. Now, it is apparent that the only time the servo motor can be under the control of error signals developed by transmissions over the fine channel is when the position of the controlling object is very nearly in synchronism with the position of the controlled object, i.e. less than the number of degrees represented by a half-cycle of the wave form 44 on either side of the 0° or synchronous position. Placing the servo motor under the control of the fine channel at any other time would result in the position of the controlled object being continually out of synchronism by some multiple of $$\frac{360}{10}$$

or 36 degrees as is well understood in the art.

As previously stated the prior art switching controls for dual channel systems of this kind have relied on the coincidence of near zero amplitude between the wave forms 43 and 44 to effect switching from the coarse channel to the fine channel. However, it is apparent from these wave forms that this coincidence occurs both at the zero position when the positions of the objects are in synchronism as well as at the 180° position where the positions of the objects are 180° out of synchronism. Accordingly, the prior art systems can switch at either position and out of this fact arises the so-called "180° ambiguity."

When my new switching control is embodied in an otherwise conventional dual channel system the "180° ambiguity" is positively eliminated. This can be seen from an analysis of the waveforms shown in the upper portion of Fig. 2. The wave form 45 represents the magnitude and phase of the output voltage developed across the derived reference coil 17 on the receiver rotor 11 of the coarse channel 1. Similarly, the wave form 46 represents the magnitude and phase of the voltage developed across the derived reference coil 18 on the receiver rotor 12 in the fine channel 2. It will be noted that the wave forms 43 and 45 and the wave forms 44 and 46 are similar in amplitude and period but the wave form 45 is displaced ninety electrical degrees from the wave form 43 and the wave form 46 is displaced ninety electrical degrees from the wave form 44. As seen in the figure the wave form 45 has a maximum positive amplitude at the 0° position whereas the wave form 46 has a maximum negative amplitude. At the 180° position both of the wave forms 45 and 46 have maximum negative amplitudes. At all other positions between 0° and 180° these wave forms differ in phase and magnitude.

As explained in connection with Fig. 1 the derived reference voltages represented by these wave forms are impressed on the resistances 38 and 40 of the summing network 37 to effect an electrical summation at the junction 41 in Fig. 1. The phase and amplitude of this summation is represented in Fig. 2 by the dotted wave form 47. It is now seen that I have provided electrical conditions which can be relied on to positively distinguish between the 180° coincidence of the wave forms 43 and 44 and the 0° coincidence of those wave forms. At the 180° coincidence the wave form 47 has a maximum negative amplitude whereas at the 0° coincidence the wave form 47 has a zero amplitude and within a narrow range on either side of the 0° position the amplitude of the wave form 47 is very low. It will also be noted that at no position between 0° and 180° does the wave form 47 have a magnitude and phase which even approximates either of these conditions.

Now, as described in connection with Fig. 1 the amplifier 36 is adapted to produce no output voltage except when the voltage impressed on its input is at or below some predetermined minimum value. Accordingly, if this critical value is set at some low level represented by the dotted line 48 in Fig. 2 the amplifier will only produce an output voltage whenever the wave form 47 has a positive value and a magnitude less than that indicated at 48. The system can establish a stable condition of this kind only between the points 49 and 50 adjacent the 0° position. It follows that only at this time will the solenoid of the switch 20 be energized to connect the servo amplifier 21 to the error coil 12 of the fine channel. Under all other conditions the solenoid of the switch 20 will be de-energized and the servo amplifier 21 will be connected to the error coil 11 of the coarse channel.

From the foregoing it is seen that the "180° ambiguity" is completely eliminated from my new switching control. The system is arranged so that actuation of the relay occurs only in response to the unique conditions indicative of actual electrical alignment of the reference coils on the receiver rotors and hence of actual synchronism between the position of the controlled object and the position of the controlling object. It will be apparent to those skilled in the art that various modifications of the system described in Fig. 1 may be made. The scope of my invention is not to be limited to the details of the system shown in Fig. 1 but is solely limited to the scope of the following claims.

I claim:

1. In a dual channel selsyn controlled servo motor system having a coarse channel and a fine channel for transmitting positional information from a controlling object to a servo motor driven controlled object and in which the controlling object drives the rotors of the coarse and fine channel transmitters at predetermined different speed ratios relative to the speed of the controlling object and the servo motor drives the rotors of the coarse and fine channel receivers at the same predetermined different speed ratios relative to the motion of the controlled object, a switching system for changing the control of the servo motor from one channel to the other, which switching system comprises a derived reference coil operating in the stator field of said coarse channel receiver and electrically orthogonal to the excitation coil on the rotor of the coarse channel receiver, a derived reference coil operating in the stator field of said fine channel receiver and electrically orthogonal to the error coil on the rotor of the fine channel receiver, switching means for alternatively connecting the servo motor rotor to one or the other of the error coils of said receivers, and means responsive to electrical alignment of said reference coils for actuating said switching means.

2. In a dual channel selsyn controlled servo motor system having a coarse channel and a fine channel for transmitting positional information from a controlling object to a servo motor driven controlled object and in which the controlling object drives the rotors of the coarse and fine channel transmitters at predetermined different speed ratios relative to the speed of the controlling object and the servo motor drives the rotors of the coarse and fine channel receivers at the same predetermined different speed ratios relative to the motion of the controlled object, a switching system for changing the control of the servo motor from one channel to the other, which switching system comprises a derived reference coil operating in the stator field of said coarse channel receiver and electrically orthogonal to the excitation coil on the rotor of the coarse channel receiver, a derived reference coil operating in the stator field of said fine channel receiver and electrically orthogonal to the error coil on the rotor of the fine channel receiver, switching means for alternatively connecting the rotor of said servo motor to one or the other of the error coils of said receivers to the other, and means responsive to electrical alignment of said reference coils for actuating said switching means only when said reference coils are in a predetermined condition of relative electrical alignment.

3. In a dual channel selsyn controlled servo motor system having a coarse channel and a fine channel for transmitting positional information from a controlling object to a servo motor driven controlled object and in which the controlling object drives the rotors of the coarse and fine channel transmitters at predetermined different speed ratios relative to the speed of the controlling object and the servo motor drives the rotors of the coarse and fine channel receivers at the same predetermined different speed ratios relative to the motion of the controlled object, a switching system for changing the control of the servo motor from one channel to the other, which switching system comprises a derived reference coil operating in the stator field of said coarse channel receiver and electrically orthogonal to the error coil of the coarse channel receiver, a derived reference coil operating in the stator field of said fine channel receiver and electrically orthogonal to the error coil of the fine channel receiver, means for switching the control of said servo motor from one of said receivers to the other, and means responsive to electrical alignment and mis-alignment of said reference coils for actuating said switching means to place said servo motor under the control of said coarse channel receiver when said reference coils are electrically mis-aligned and to place said servo motor under the control of said fine channel receiver when said reference coils are in a predetermined condition of relative electrical alignment.

4. In a dual channel selsyn controlled servo motor system having a coarse channel and a fine channel for transmitting positional information from a controlling object to a servo motor driven controlled object and in which the controlling object drives the rotors of the coarse and fine channel transmitters at predetermined different speed ratios relative to the speed of the controlling object and the servo motor drives the rotors of the coarse and fine channel receivers at the same predetermined different speed ratios relative to the motion of the controlled object, a switching system for changing the control of the servo motor from one channel to the other, which switching system comprises a derived reference coil operating in the stator field of said coarse channel receiver and electrically orthogonal to the excitation coil on the rotor of the coarse channel receiver, a derived reference coil operating in the stator field of said fine channel receiver and electrically orthogonal to the error coil on the rotor of the fine channel receiver, means for switching the control of said servo motor from the error coil of one of said receivers to the error coil of the other receiver, an impedance network for comparing the outputs of said reference coils, and amplifier means responsive to said compared outputs to actuate said switching means to connect said servo motor to the error coil of the fine channel receiver only when the outputs of said reference coils are substantially 180° out of phase and of substantially equal magnitude, and said switching means connecting said servo motor to the error coil of said coarse channel receiver for all other phase and magnitude relations of the outputs of said reference coils.

No references cited.